(12) United States Patent
Reimnitz et al.

(10) Patent No.: US 12,500,477 B2
(45) Date of Patent: Dec. 16, 2025

(54) ELECTRIC MACHINE ARRANGEMENT

(71) Applicant: Schaeffler Technologies AG & Co. KG, Herzogenaurach (DE)

(72) Inventors: Dirk Reimnitz, Bühl (DE); Ivo Agner, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 340 days.

(21) Appl. No.: 18/042,946

(22) PCT Filed: Jul. 8, 2021

(86) PCT No.: PCT/DE2021/100597
§ 371 (c)(1),
(2) Date: Feb. 24, 2023

(87) PCT Pub. No.: WO2022/042787
PCT Pub. Date: Mar. 3, 2022

(65) Prior Publication Data
US 2023/0307988 A1 Sep. 28, 2023

(30) Foreign Application Priority Data
Aug. 26, 2020 (DE) .......................... 102020122255.6

(51) Int. Cl.
*H02K 7/08* (2006.01)
*H02K 5/10* (2006.01)
*H02K 11/20* (2016.01)

(52) U.S. Cl.
CPC ............... *H02K 7/085* (2013.01); *H02K 5/10* (2013.01); *H02K 11/20* (2016.01)

(58) Field of Classification Search
CPC ...... H02K 1/182; H02K 11/20; H02K 11/215; H02K 11/40; H02K 21/24; H02K 5/10; H02K 5/161; H02K 5/24; H02K 7/083
See application file for complete search history.

(56) References Cited

U.S. PATENT DOCUMENTS

| | | | |
|---|---|---|---|
| 6,765,327 B2 * | 7/2004 | Hashimoto | H02K 21/24 310/90 |
| 2003/0184173 A1 * | 10/2003 | Hashimoto | H02K 5/1735 310/90 |
| 2009/0315544 A1 * | 12/2009 | Takahashi | G01D 5/2452 702/155 |

FOREIGN PATENT DOCUMENTS

| | | | | |
|---|---|---|---|---|
| DE | 102018117315 A1 | 1/2020 | | |
| WO | WO-2015060772 A1 * | 4/2015 | ............. | H02K 11/00 |

OTHER PUBLICATIONS

WO-2015060772-A1, Lassilla, all pages (Year: 2015).*

* cited by examiner

*Primary Examiner* — Naishadh N Desai
(74) *Attorney, Agent, or Firm* — Volpe Koenig (57) ABSTRACT

The disclosure relates to an electric machine arrangement comprising an electric axial flux machine having a stator and a rotor, further comprising a component supporting the stator, and comprising an output element that is in contact with the rotor for conjoint rotation therewith. The rotor is rotatably mounted in the electric machine arrangement via at least one bearing point. According to the disclosure, a shaft grounding element and/or a rotor position sensor is/are arranged in a space located between the rotor shaft and the stator in the radial direction and within the axial extent of the stator in the axial direction.

9 Claims, 10 Drawing Sheets

ELECTRIC MACHINE ARRANGEMENT

CROSS-REFERENCE TO RELATED APPLICATIONS

This application is the U.S. National Phase of PCT Appln. No. PCT/DE2021/100597, filed Jul. 8, 2021, which claims the benefit of German Patent Appln. No. 102020122255.6, filed Aug. 26, 2020, the entire disclosures of which are incorporated by reference herein.

TECHNICAL FIELD

The present disclosure relates to an electric machine arrangement, and more particularly to an electric axial flux machine having a stator and having a rotor, a component supporting the stator and an output element that is in contact with the rotor for conjoint rotation therewith, wherein the rotor is arranged rotatably mounted in electric machine arrangement via at least one bearing point.

BACKGROUND

In electric motors, the position of the parts through which the magnetic field flows is very important. This applies both to the mechanical structure of the electric motor, through which the parts are positioned in relation to one another, and to precise knowledge of the angular position of the rotating parts, via which the exact current position of the rotor relative to the stator is detected. An exact, rigid mechanical structure is important, since even small deviations in the position of the parts among one another can have a significant effect on the magnetic flux (e.g., due to altered air gaps). In addition, precise knowledge of the current position of the rotor is also crucial, because the constantly changing position of the magnets integrated into the rotating rotor (angular position) relative to the magnets integrated into the stator must always be known exactly when the motor is rotating in order to control the electric motor correctly. It is therefore important to integrate a rotor position sensor into the mechanical structure of the electric motor in such a way that the sensor can detect the relative position of the magnetically significant parts exactly, i.e., with the lowest possible tolerance influence. At the same time, however, the sensor must not negatively influence the mechanical structure of the electric motor due to its size and its installation conditions, so that a sufficiently robust and dimensionally accurate design of all parts and assemblies is possible, as is their precise alignment during assembly.

In addition to the rotor position sensor, elements for grounding the rotor or the rotor shaft and elements that electrically insulate the rotor relative to the stator must also be integrated into most electric motors. These grounding and/or insulating elements prevent the electrical voltage induced in the mechanical structural elements of the electric motor from being discharged via the bearings or being transmitted to the neighboring components of the electric motor.

SUMMARY

The present disclosure is based on the object of providing a machine arrangement with an electric axial flux machine in which a shaft grounding element and/or a rotor position sensor are integrated into the axial flux machine in such a way that it is optimized with a view to the smallest possible installation space. Advantageously, with an optimized installation space, the mechanical structure of the axial flux machine should not be negatively influenced as far as possible with regard to the influences introduced into the structure.

In accordance with one aspect, an electric machine arrangement according to the disclosure comprises an electric axial flux machine for driving an electrically drivable motor vehicle, having a stator and a rotor, further comprising a component supporting the stator, and an output element that is in contact with the rotor for conjoint rotation therewith. In this case, the rotor is rotatably mounted via at least one bearing point within the electric machine arrangement. According to the disclosure, a shaft grounding element and/or a rotor position sensor is/are arranged in a space located between the rotor shaft and the stator in the radial direction and within the axial extent of the stator in the axial direction. This achieves the advantage that a machine arrangement with an axial flux machine can be provided that, together with an integrated rotor position sensor and/or an integrated shaft grounding element, takes up very little space. Furthermore, the proposed design does not negatively affect the structure of the axial flux machine with regard to its stability. The need to make the structure of the electric motor particularly rigid and to manufacture all components with a high degree of precision and align them in a complex manner during assembly often conflicts with the requirements for compact design, low weight, high power density, production processes suitable for large-scale production and low costs that always exist in vehicle construction for electric motors for motor vehicles.

With regard to the sensors and the shaft grounding elements and/or insulating elements, this means that these must be integrated into the electric motor in such a way that they have a low tolerance influence in two respects. On the one hand, their measurement accuracy and functional reliability must not be influenced to an unacceptable degree by tolerances, and on the other hand, the sensors and the shaft grounding elements and/or insulating elements must not unacceptably increase the tolerances and elasticity of the mechanical structure of the electric motor. The positions for a shaft grounding element and/or a rotor position sensor proposed within the scope of the disclosure enable a high degree of measuring accuracy for the sensors. Furthermore, this ensures a high level of functional reliability for the sensors, the shaft grounding elements and/or insulating elements and their negative influence on the tolerances, the rigidity and the space requirement of the electric motor can be minimized.

Further advantageous embodiments of the disclosure are specified in the dependent claims. The features listed individually in the dependent claims can be combined with one another in technologically meaningful ways and can define further embodiments of the disclosure. In addition, the features indicated in the claims are specified and explained in more detail in the description, wherein further preferred embodiments of the disclosure are shown.

First, the individual elements of the claimed subject matter of the disclosure are explained in the order in which they are named in the set of claims or according to their relevance with respect to the disclosure, and particularly preferred embodiments of the subject matter of the disclosure are described below.

Electric machines are used to convert electrical energy into mechanical energy and/or vice versa, and generally include a stationary part referred to as a stator, stand, or armature, and a part referred to as a rotor or runner, and arranged movably relative to the stationary part.

In the case of electric machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator.

The housing encloses the electric machine. A housing can also accommodate the control and power electronics. The housing can furthermore be part of a cooling system for the electric machine, and can be designed in such a way that cooling fluid can be supplied to the electric machine via the housing and/or the heat can be dissipated to the outside via the housing surfaces. In addition, the housing protects the electric machine and any electronics that may be present from external influences.

The stator of a radial flux machine is usually constructed cylindrically and generally consists of electrical laminations that are electrically insulated from one another and are constructed in layers and packaged to form laminated cores. With this structure, the eddy currents in the stator caused by the stator field are kept low. Distributed over the circumference, grooves or peripherally closed recesses are embedded into the electrical lamination running parallel to the rotor shaft, and accommodate the stator winding or parts of the stator winding. On the basis of the construction towards the surface, the slots can be closed with locking elements such as locking wedges or covers or the like to prevent the stator winding from being detached.

A rotor is the rotating (spinning) part of an electric machine. In particular, a rotor is used when there is also a stator. The rotor generally comprises a rotor shaft and one or more rotor bodies arranged on the rotor shaft for conjoint rotation. The rotor shaft can also be hollow, which on the one hand saves weight and on the other hand allows lubricant or coolant to be supplied to the rotor body. If the rotor shaft is hollow, components, for example shafts, from adjacent units can protrude into the rotor or through the rotor without negatively influencing the functioning of the electric machine.

The gap between the rotor and the stator is called the air gap. In a radial flux machine, this is an axially extending annular gap with a radial width that corresponds to the distance between the rotor body and the stator body. The magnetic flux in an electric axial flux machine, such as an electric drive machine of a motor vehicle designed as an axial flux machine, is directed axially in the air gap between the stator and rotor, parallel to the axis of rotation of the electric machine. The air gap that is formed in an axial flux machine is thus essentially in the form of a ring disk.

The magnetic flux in an electric axial flux machine, such as an electric drive machine of a motor vehicle designed as an axial flux machine, is directed axially in the air gap between the stator and rotor, parallel to the axis of rotation of the electric machine. With axial flux machines, a differentiation is made, among other things with a view to their expansion, between axial flux machines in an I-arrangement and axial flux machines in an H-arrangement. An axial flux machine in an I-arrangement is understood as meaning an electric machine in which a single rotor disk of the electric machine is arranged between two stator halves of a stator of the electric machine and can be acted upon by a rotating electromagnetic field. An axial flux machine in an H-arrangement is understood to be an electric machine in which two rotor disks of a rotor of the electric machine accommodate a stator of the electric machine in the annular space located axially therebetween, via which the two rotor disks can be subjected to a rotating electromagnetic field. The two rotor disks of an electric machine in an H-arrangement are mechanically connected to one another. This usually takes place via a shaft or a shaft-like connecting element, which protrudes radially inward (radially inside the magnets of the electric machine) through the stator and connects the two rotor disks to one another radially inward. A special form of the H-arrangement is represented by electric machines, the two rotor disks of which are connected to one another radially on the outside (radially outside of the magnets of the electric machine). The stator of this electric machine is then fastened radially on the inside (usually on one side) to a component that supports the electric machine. This special form of the H-arrangement is also known as the J-arrangement.

According to an advantageous embodiment of the disclosure, it can be provided that a bearing is formed between the stator and the rotor. The advantage of this configuration lies in the fact that the machine arrangement or the components of the machine arrangement are more stable against tipping than one another.

According to a further preferred development of the disclosure, it can also be provided that the bearing (61) has a first bearing point (611) and a second bearing point (612) spaced axially from the first bearing point (611). As a result, in addition to a further improvement in the tilting stability, an additional protected installation space for accommodating a shaft grounding element 11 and/or a rotor position sensor can be provided.

Furthermore, according to a likewise advantageous embodiment of the disclosure, it can be provided that the shaft grounding element and/or the rotor position sensor is/are arranged between the first bearing point and the second bearing point. The advantageous effect of this configuration is based on the fact that the two bearing points can be arranged with the greatest possible axial distance from one another in the available axial space of the electric machine, which creates a robust and tilt-resistant bearing base for the rotor bearing and/or the connection of rotor and stator. By placing the shaft grounding element and/or the rotor position sensor between the first and the second bearing position, a compact and functionally reliable arrangement of the components can also be realized.

According to a further particularly preferred embodiment of the disclosure, it can be provided that the rotor is mounted via at least one bearing by means of at least one first bearing point in relation to the component supporting the stator. By supporting the rotor on a component that supports the stator and not directly connecting it to the stator via a bearing point, the mechanical stresses on the structure of the stator are reduced. This allows a more cost-effective design of the stator or allows the stator design to be optimized even more with regard to the magnetic properties of the electric machine and to optimize its efficiency.

Furthermore, the disclosure can also be further developed such that the shaft grounding element and the rotor position sensor are arranged on axially opposite sides of the rotor. If the shaft grounding element and the rotor position sensor are arranged on axially opposite sides of the rotor and take up a similar amount of installation space there, this enables a relatively symmetrical design of the rotor, the rotor shaft and/or the rotor bearing. This is advantageous with regard to the robustness, the accuracy of the bearing, and the material utilization of the individual components.

In a likewise preferred design variant of the disclosure, it can also be provided that the shaft grounding element and the rotor position sensor are arranged axially on the same side of the rotor. As a result, the structure of the axial flux machine can be well adapted to asymmetrical installation space conditions, as is the case, for example, with a one-sided bearing of the rotor shaft or if external forces acting asymmetrically on the electric machine require bearings of different dimensions and thus taking up different amounts of installation space. If the shaft grounding element and the rotor position sensor have to be protected from external influences, for example from cooling or lubricating media, it can also make sense to arrange the shaft grounding element and the rotor position sensor axially on the same side of the rotor in order to be able to place them in the same space shielded (or sealed) from external influences.

It can also be advantageous to further develop the disclosure such that the shaft grounding element and/or the rotor position sensor is/are arranged outside the axial region formed between the first bearing point and the second bearing point, adjacent to the first bearing point or adjacent to the second bearing point. The advantage that can be realized in this way is that the shaft grounding element and/or the rotor position sensor is/are more easily accessible from the outside after the electric machine has been assembled. This makes it easier, for example, to readjust the rotor position sensor after the electric machine has been installed. If the shaft grounding element is easily accessible from the outside, worn shaft grounding elements can also be easily replaced with new ones without having to completely disassemble the electric machine.

According to a further preferred embodiment of the subject matter of the disclosure, it can be provided that the shaft grounding element and/or the rotor position sensor are integrated into a bearing point designed as a roller bearing. If the shaft grounding element and/or the rotor position sensor is/are integrated into a bearing point designed as a roller bearing, a particularly compact space-saving arrangement is possible. The shaft grounding system and the rotor position detection system always have components that are attached to the two units that can be rotated at relative speeds. The shortest possible tolerance chain between the two rotatable units results when the components of the shaft grounding system and/or the rotor position detection system are attached directly to the bearing rings (e.g., inner and outer ring) of the same roller bearing. Since the geometric deviation that the rotor position sensor or the shaft grounding element then has to compensate for is very small, the rotor position sensor and the shaft grounding element can be made particularly small and compact if they are integrated into a bearing point.

Finally, the disclosure can also be implemented in an advantageous manner such that the shaft grounding element and/or the rotor position sensor are arranged in a dry space formed around them. If the shaft grounding element and/or the rotor position sensor are protected from external influences, for example by a dry space arranged around them, a particularly high level of functional reliability, accuracy and service life can be achieved. Due to a dry space formed around them, shaft grounding elements optimized for dry environments can also be used for electric machines in which a cooling or lubricating liquid can get between the rotor and the stator.

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic. Identical reference symbols indicate the same objects, so explanations from other figures can additionally be used.

DETAILED DESCRIPTION

Figure 1:
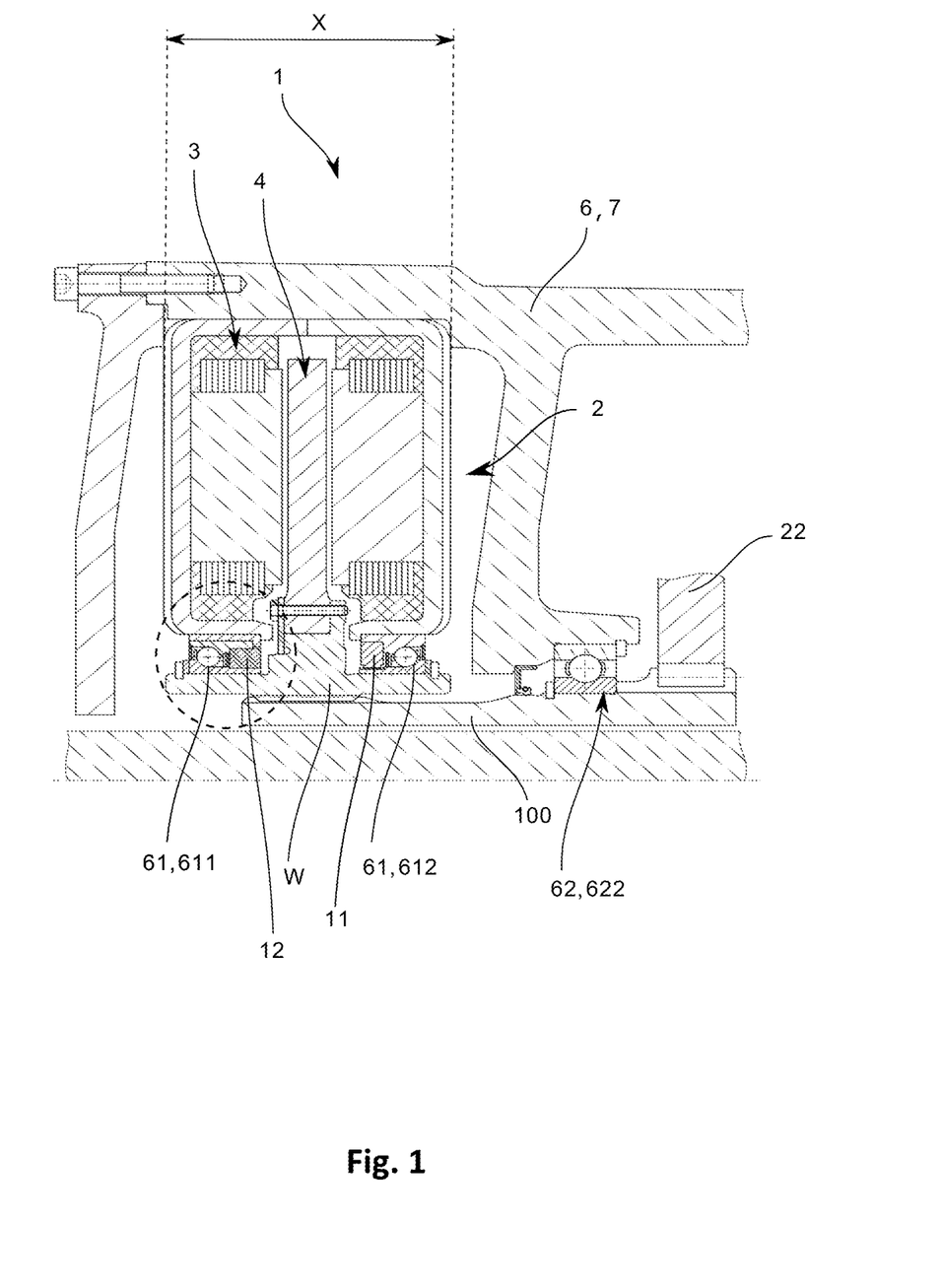
FIG. 1 shows an axial flux motor in an I-arrangement having a shaft grounding ring and a rotor position sensor, arranged between two axially spaced bearing points of a bearing between the rotor and stator, in an axial section in a schematic representation.

FIG. 1 shows an electric machine arrangement 1, comprising an electric axial flux machine 2 in an I-arrangement for driving an electrically drivable motor vehicle, a component 6 supporting the stator 3 in the form of a housing 7 and an output element 100 designed as an output shaft that is in contact with the rotor 4 for conjoint rotation therewith. The axial flux machine 2 has a stator 3 and a rotor 4. The rotor 4 is rotatably mounted in the electric machine assembly 1 via two axially spaced bearing points 611, 612. In addition, the output element 100 designed as an output shaft is supported via a further bearing point 622 in the side wall of a housing 7 of the axial flux machine 2. It can clearly be seen that a shaft grounding element 11 and/or a rotor position sensor 12 is/are arranged in a space located between the rotor shaft W and the stator 3 in the radial direction and within the axial extent X of the stator 3 in the axial direction. The rotor shaft W is connected via internal gearing to an external gearing of the output shaft, wherein the output shaft meshes outside of the housing 7 via additional external gearing with the gear wheel of a gear stage 22.

A bearing point 611 designed as a roller bearing with an integrated rotor position sensor 12 is shown on the left-hand side of the axial flux machine 2. The bearing inner ring and the bearing outer ring both have a connecting contour next to the raceway for the roller bodies, to which the rotor position sensor 12 is attached. In FIG. 1, the region between the inner ring and the outer ring, which is available for the rotor position sensor 12, is shown as a hatched cross-sectional area. Parts of the rotor position sensor 12 are connected to the bearing inner ring and other parts of the rotor position sensor 12 are connected to the bearing outer ring. The rotor position sensor 12 detects the angular position of the sensor parts that are connected to the electromagnets of the stator 3 for conjoint rotation therewith via the bearing outer ring, relative to the parts of the rotor position sensor 12 that are connected to the permanent magnets of the rotor 4 for conjoint rotation therewith via the bearing inner ring. The angular position of the permanent magnets relative to the electromagnets can thus be continuously detected via the rotor position sensor 12. This information is necessary for the correct activation of the electromagnets of the axial flux machine 2.

Figure 2:
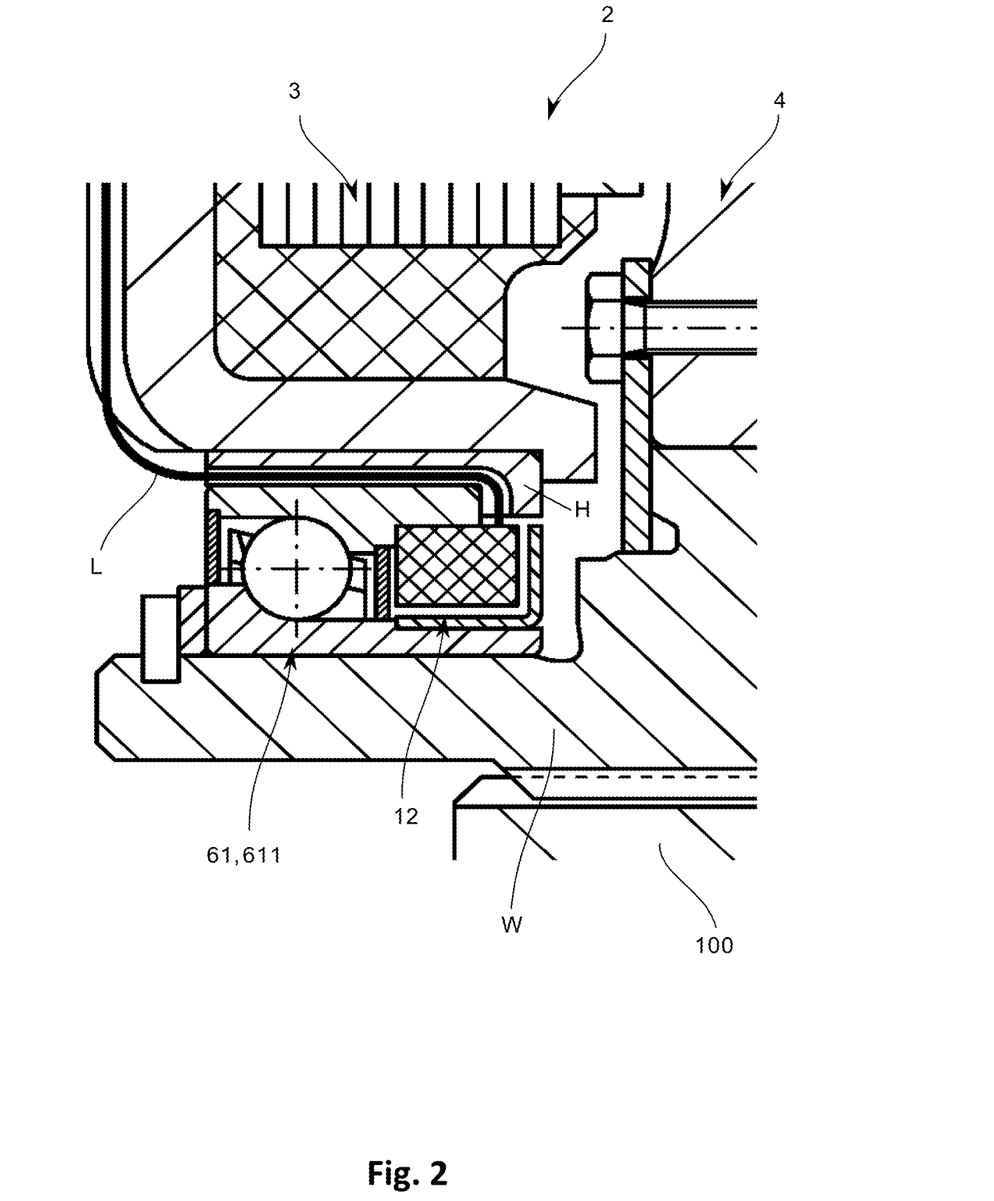
FIG. 2 shows a detail according to FIG. 1, wherein an electrical line connection to the rotor position sensor is shown.

FIG. 2 shows a somewhat more detailed sectional view of the bearing point 611 with integrated rotor position sensor 12. A component is fastened to the bearing inner ring, which has a cylindrical surface and/or an end face as a measurement reference, the circumferential position of which can be detected by the part of the rotor position sensor 12 fastened to the bearing outer ring. The active sensor part attached to the outer ring is connected to a cable. Depending on the design, this part can measure radially to the cylindrical reference surface or axially to the face that is orthogonal to the axis of rotation. So that the circumferential position of the reference surface can be detected, the reference surfaces can have elevations, depressions or recesses, or they can consist of regions with different material properties. For example, different materials can be arranged one behind the other in the circumferential direction or, for example, regions can be magnetized differently.

FIGS. 1 and 2 show that in this exemplary embodiment a sleeve H is pressed between the bearing outer ring and the housing of the stator 3. This sleeve H can be made of electrically non-conductive material in order to prevent the voltages induced in the rotor 4 or stator 3 by the magnetic fields from being able to discharge via the bearing point 611. Current flowing through the roller contacts of the bearing point 611 can damage the bearing. This sleeve H can also be used to enable simple and functionally reliable cable routing for the rotor position sensor 12. As FIG. 2 shows, this sleeve H has a partially slotted design, so that one or more lines L of the rotor position sensor 12 can be routed through the slot or through multiple slots. It is thus possible to connect the rotor position sensor 12 to the bearing outer ring, lay the lines L of the rotor position sensor 12 over the bearing outer ring and then slide the sleeve H over the bearing outer ring in such a way that the lines L lie in the slots and are not damaged by the sleeve H. The bearing point 611, rotor position sensor 12 and sleeve H then form a testable unit that can then be pressed into the housing of stator 3. The radial and/or axial transmission of force between the bearing point 611 and the housing then takes place via the sleeve H. The sleeve H only needs to have one slot or a differently shaped recess on the circumference, through which all lines L of the rotor position sensor 12 can run. However, so that the sleeve H supports the bearing ring as evenly as possible on the circumference and also has the most uniform rigidity possible, it usually makes more sense to lay multiple lines L through multiple slots distributed around the circumference, which are only as large as is necessary for the respective line L. In order to achieve the most uniform possible rigidity of the sleeve H, it can also make sense to provide significantly more slots or differently shaped recesses in the sleeve H than there are sensor cables and to arrange these slots of the same shape evenly on the circumference of the sleeve H. When the roller bearing of the bearing point 611 has been pressed into the stator 3 together with the sleeve H, the sensor cable or the line L can be laid radially outwards and fastened to the outside of the stator housing. It is particularly space-saving if the line L can be routed in recesses in the stator housing that are provided anyway.

Alternatively to using a slotted sleeve H, the bearing outer ring or the bearing seat of the stator housing can also be partially slotted in order to be able to route the line L of the rotor position sensor 12 in the axial direction.

A roller bearing of a bearing point 612 with an integrated shaft grounding element 11 is shown on the right-hand side of the axial flux motor shown in FIG. 1. This roller bearing has a connecting contour on the inner and outer ring, to which the shaft grounding element 11 and the component forming the contact surface for the shaft grounding element 11 can be fastened. In this exemplary embodiment, the shaft grounding element 11 is fastened to the stationary bearing outer ring and establishes the electrical connection between the bearing outer ring and the contact surface on the bearing inner ring. For this purpose, the shaft grounding element 11 is electrically conductive and always touches the contact surface with a slight contact force. Since the shaft grounding element 11 slides on the circumference of the reference surface, the rotary movement between the bearing inner ring and the bearing outer ring is possible without the electrical conductivity being interrupted. In this embodiment, the contact surface for the shaft grounding element 11 is not formed directly by the bearing inner ring, but by a separate component, so that the material and the surface treatment of the contact surface can be optimized independently of the material, the heat treatment and the surface treatment of the bearing inner ring. For applications in which the surface properties of the bearing inner ring are sufficient for shaft grounding, the shaft grounding element 11 can also touch the bearing inner ring directly. Alternatively, the shaft grounding element 11 can also slide on a component attached to the rotor shaft W or directly on the rotor shaft W if its properties are suitable for this.

Both rotor bearings (bearing points 611, 612) of the exemplary embodiment shown in FIG. 1 are angular contact ball bearings and are aligned with one another in an O-arrangement. Of course, rotor position sensors 12 and shaft grounding elements 11 can also be integrated into bearings of other types or fastened to bearings of other types. In terms of the function of the rotor position sensor 12 and the grounding element 11, the shape of the roller element raceway and the roller elements, which determine the type of bearing, have only a minor influence. However, it is important for the rotor position sensor 12 that the bearing rings to which the rotor position sensor 12 or the component forming the reference surface are attached cannot rotate relative to the magnets of the electric motor to which they are assigned. Since even small position errors of the rotor position sensor 12 can lead to significant measuring errors and errors in the motor control, unintentional wandering of the bearing rings on their bearing seat must be prevented for all bearings with an integrated rotor position sensor 12. This can best be prevented by means of a form fit acting in the circumferential direction.

It is crucial for the shaft grounding element 11 that the bearing rings to which the shaft grounding element 11 is connected are always conductively connected to their neighboring components and the conductivity between the bearing rings and their bearing seat is not impaired.

In the exemplary embodiment shown in FIG. 1, the rotor bearings (bearing points 611, 612) are arranged on the opposite end regions of the rotor shaft W and are therefore located radially inside the axial end regions of the two stator halves. This arrangement leads to the largest possible bearing spacing within the axial length of the axial flux machine 2 and thus to the largest possible rigid bearing base. In order to be able to arrange the bearing points 611, 612 so far apart from one another, the rotor position sensor 12 and the shaft grounding element 11 have been arranged axially inside the two roller element raceways. To aid the smooth rotor bearing, the complex cable routing to the rotor position sensor 12 has been accepted in this exemplary embodiment.

Alternatively, to simplify cable routing, the bearing of the bearing point 611 with integrated rotor position sensor 12 can also be arranged the other way around, so that the rotor position sensor 12 faces away from the rotor 4 and is located near the axial end region of the stator 3. The line L can then be routed along the outside of the stator 3 in a relatively simple manner. The bearing point 612 with the shaft grounding element 11 can of course also be designed in such a way that the shaft grounding element 11 faces away from the rotor 4 in the axial direction and is located near the axial end region of the stator 3.

Figure 3:
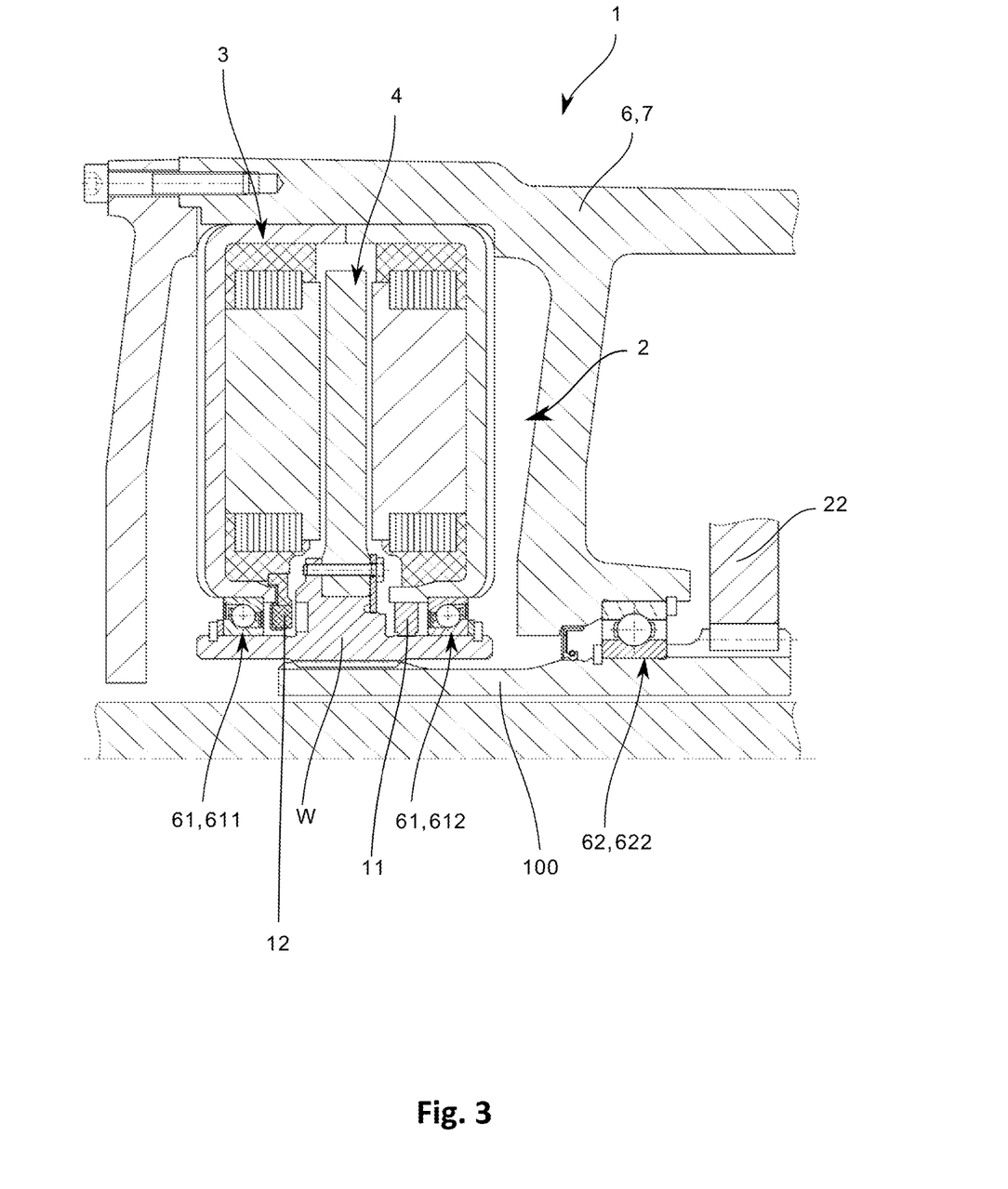
FIG. 3 shows a further example of an axial flux machine in an !-arrangement having a further possibility of arranging the shaft grounding ring and rotor position sensor, in an axial section in a schematic representation.

FIG. 3 shows a further example of an axial flux machine 2 in an I-arrangement having a further possibility of arranging the shaft grounding element 11 and rotor position sensor 12, in an axial section in a schematic representation. In this exemplary embodiment, the rotor position sensor 12 and the shaft grounding element 11 are not connected directly to the rotor bearings or integrated into the bearing points 611, 612. Rather, they are arranged as separate assemblies in the vicinity of the bearings 611, 612. The rotor position sensor 12 is again arranged on the left-hand side of the rotor 4 of the axial flux machine 2 between the left-hand rotor bearing, which forms the left-hand bearing point 611, and the rotor 4. The active part of the rotor position sensor 12 is again shown as a hatched cross-section, which is mechanically and electrically connected to the stator 3 via a fastening plate and a connecting element. The lines L (not shown in the figure), or electrical conductors of a different design, which connect the rotor position sensor 12 to the motor control unit (not shown) can be routed through the connection element and the interior of the stator 3 to the point at which the stator 3 is electrically connected to the motor control unit. In terms of assembly, it can be useful to provide a plug and/or plug connection between the connection element of the rotor position sensor 12 and the stator 3. This means that the electrical conductors L required for connecting the rotor position sensor 12 can be mounted inside the stator 3 at an early stage during assembly or even integrated into the plastic parts there (e.g., by casting or overmolding) and the rotor position sensor 12 can only be connected to these conductors L later in the assembly process.

In the case of the rotor position sensor 12 shown in this exemplary embodiment, the reference surface, the bearing of which is detected by the active sensor parts of the rotor position sensor 12, is formed directly by the rotor base formed from the rotor shaft W. The figure shows one of the recesses distributed around the circumference and integrated into the face of the rotor base. Since the contour of a rotor component that is required anyway is used directly as a measurement reference, no installation space is required for additional components forming the measurement reference, and the tolerance chain between the permanent magnets integrated into the rotor 4 and the measurement reference is also reduced.

The shaft grounding element 11 between the right-hand rotor bearing or the right-hand bearing point 612 and the rotor 4 can be seen on the right-hand side of the rotor 4. The shaft grounding element 11 is mechanically fastened directly to the housing of the stator 3 and is electrically conductively connected. In addition, the shaft grounding element 11 touches the rotor shaft W and slides on the contact surface formed by the rotor shaft W when the rotor 4 rotates in order to ensure a permanently electrically conductive connection between the stator 3 and the rotor 4. In order to additionally ensure that no electrical current can flow through the rotor bearings, the bearing rings can be electrically insulated from the electric motor components to which they are connected (e.g., the stator housing or the rotor shaft W). This can be done, for example, by non-conductive coatings on the contact surfaces. Alternatively, non-conductive materials can be used for the existing bearing or adjacent components or for additional components arranged between the bearings and their adjacent components.

For example, it is possible to use bearings with ceramic components to prevent current from flowing through the bearings.

Figure 4:
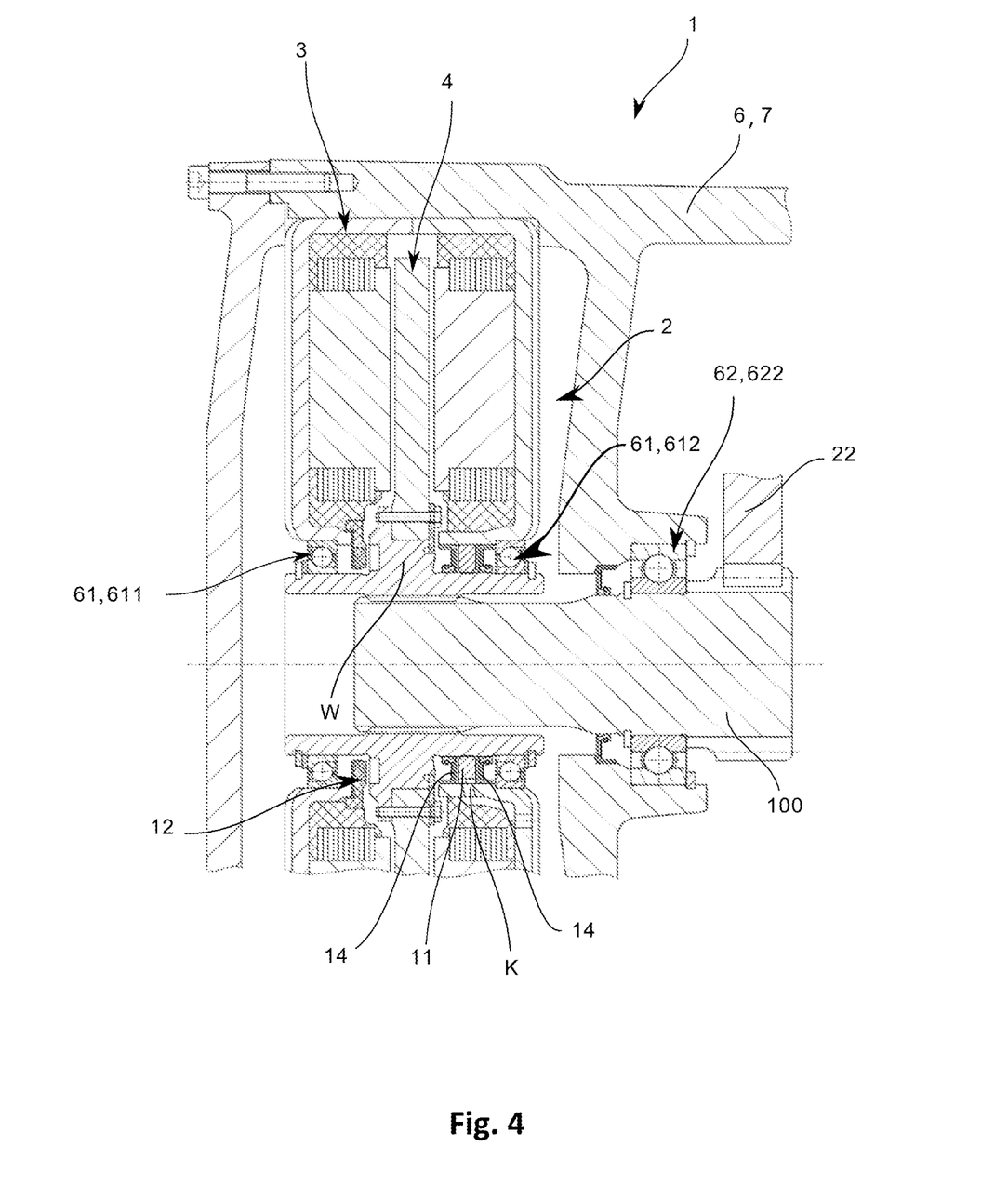
FIG. 4 shows a further example of an axial flux machine in an !-arrangement, wherein, in contrast to the embodiment according to FIG. 2, the shaft grounding ring is protected from unwanted external influences by sealing elements arranged axially on both sides, also in an axial section in a schematic representation.

FIG. 4 shows a further example of an axial flux machine 2 in an !-arrangement, wherein, in contrast to the embodiment according to FIG. 3, the shaft grounding element 11 is protected from unwanted external influences by sealing elements 14 arranged axially on both sides. The arrangement shown is useful, for example, for axial flux machines 2 that have an open cooling concept in which the cooling medium (e.g., oil or a cooling liquid) not only flows through the stator 3 in sealed channels, but also into the gap between the stator 3 and the rotor 4 and/or can get into the housing 7. The sliding contact between the shaft grounding element 11 and its contact surface must then be protected from the cooling medium (or from lubricants and dirt particles), since this would otherwise impair the conductivity between the two components. In the exemplary embodiment shown, the sealing elements 14 arranged axially on both sides next to the grounding element 11 are designed as shaft sealing rings, for example. However, other types of seals can also be used. Non-contact seals such as gap seals or labyrinth seals are particularly well suited for high-speed electric motors. Since a small amount of leakage is to be expected with almost all types of seals, a drainage channel K is provided in the exemplary embodiment, through which fluid that has penetrated can flow out of the dry space 13 again provided for the shaft grounding element 11 at the lowest point. The drainage channel K is used to drain off leakage fluid as well as to enable a pressure equalization between the sealed dry space 13 and its immediate surroundings. This is because pressure differences, such as those that can occur as a result of thermal expansion or changes in atmospheric air pressure, could otherwise force fluid through the otherwise tight sealing elements 14. The drainage channel K must end at a point at which it can be ruled out that fluid under high pressure is forced into the drainage channel K from there. At the same time, the channel cross-section must be large enough that no fluid can rise in the drainage channel K by capillary action. The undesired penetration and rise of fluid droplets or fluid mist in the channel can also be prevented by filter membranes or other fabric inserts in the channel. In the exemplary embodiment shown, there is a hole at the lowest point in the cylindrical region of the stator housing into which the shaft grounding element 11 is pressed, through which the leakage fluid can get into a channel located inside the stator 3. So that the leakage fluid, which can collect both to the right and to the left of the shaft grounding element 11, can flow into the same hole, the shaft grounding element 11 has a recess in its outer contour in the region of the hole, through which the fluid can flow into the hole from both sides. The leakage fluid is conducted through the channel in the stator to a lateral hole in the stator housing, through which the leakage fluid can flow into the housing 7 of the axial flux machine 2.

Figure 5:
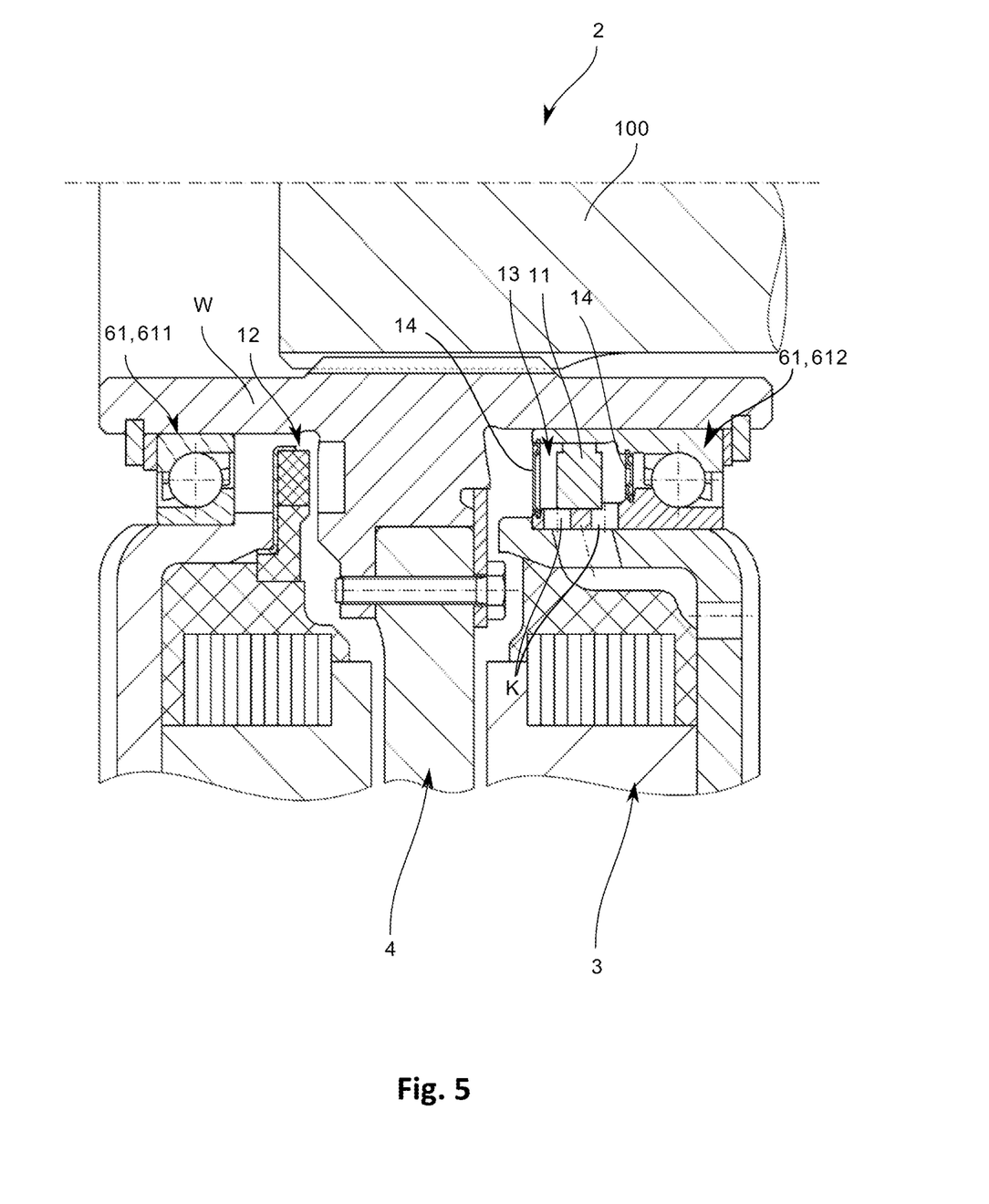
FIG. 5 shows an embodiment analogous to FIG. 4, wherein the shaft grounding element is integrated into a roller bearing and protected by means of sealing elements arranged axially on both sides.

FIG. 5 shows an embodiment analogous to FIG. 4, wherein the shaft grounding element 11 is integrated into a roller bearing and protected by means of sealing elements 14 arranged axially on both sides. In this variant, the grounding element 11 is integrated into the rotor bearing or the bearing point 612 of the bearing 61 between the rotor 4 and the stator 3. Between the bearing outer ring and the bearing inner ring, a dry space 13 is formed by two sealing elements 14 fastened to the bearing outer ring and sealing against the bearing inner ring and designed as sealing disks or cover disks, in which the shaft grounding element 11 is located. The sealing can be achieved by contact seals or non-contact seals (e.g., gap seals). In order to nevertheless be able to drain off leaking fluid that has penetrated, a radial bore (or differently designed recesses) is provided in the bearing outer ring, at the lowest point of the circumference, to the right and left of the grounding element 11, through which the leaking fluid can flow into a drainage channel K in the stator 3 can. The leakage fluid is then discharged via the channel in the stator 3.

Figure 6:
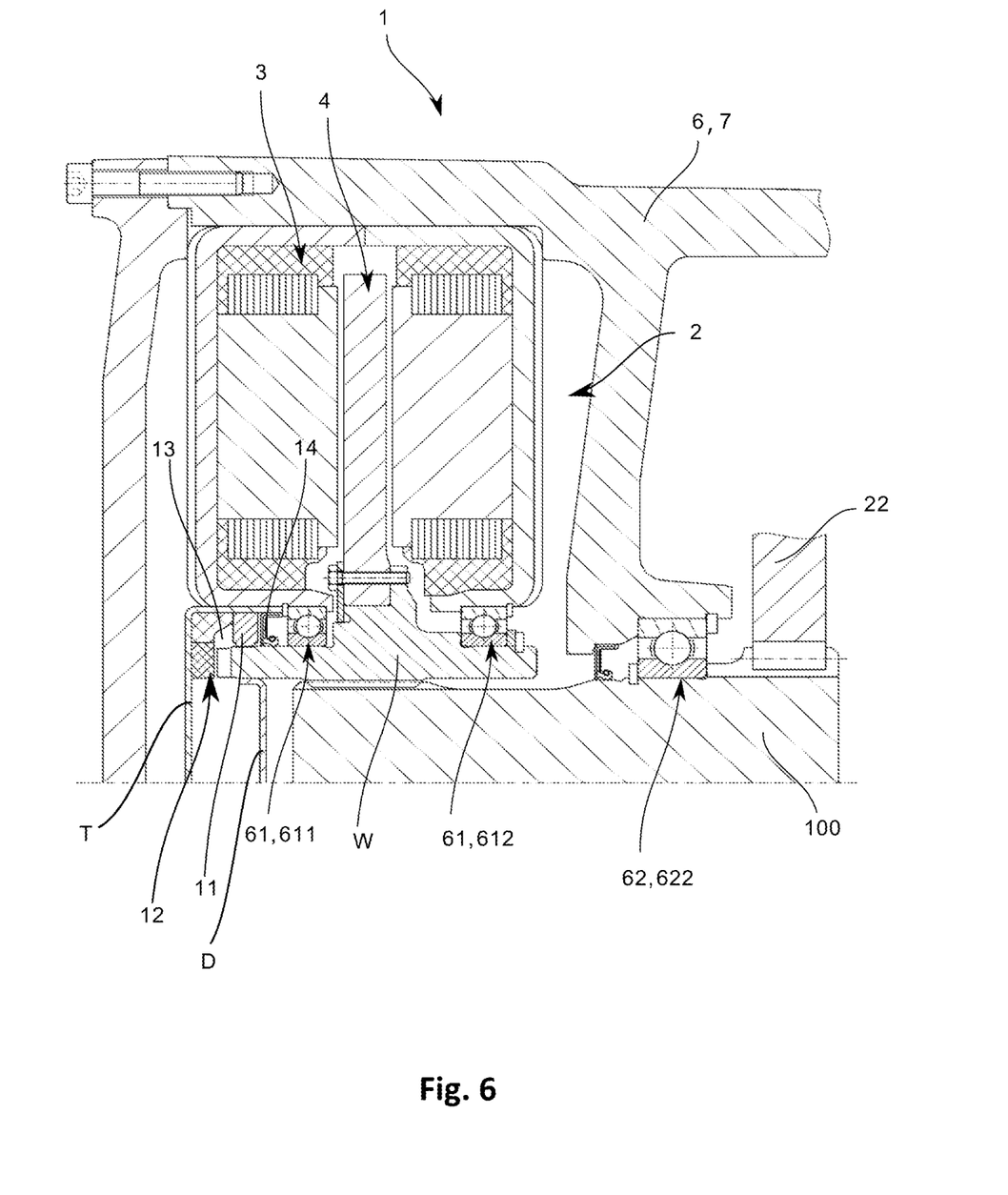
FIG. 6 shows a further possible arrangement of the shaft grounding ring and rotor position sensor, wherein these are arranged next to one another on an axial end region of the rotor shaft.

FIG. 6 shows a further possible arrangement of the shaft grounding element 11 and rotor position sensor 12, wherein these are arranged next to one another on an axial end region of the rotor shaft W. An exemplary embodiment is shown in which the rotor position sensor 12 and the grounding element 11 are arranged next to one another on an axial end region of the rotor shaft W. The rotor position sensor 12 and the grounding element 11 are mounted in a cover-like carrier T, through which they can be connected to the stator 3 as a preassembled structural unit. The cover-like carrier T, a cover D in the rotor shaft W designed as a hollow shaft and a sealing element 14 designed as a shaft sealing ring between the cover-like carrier T and the rotor shaft W create a dry space 13 for the grounding element 11 and the rotor position sensor 12. Since the cover-like carrier T and the cover D seal the end of the axial flux machine 2 opposite the output shaft, the dry space 13 in this exemplary embodiment can be sealed with a single seal at which the differential speed occurs. In this dry space 13, too, a channel can be provided at the lowest point for draining any leakage fluid that may have penetrated.

In this exemplary embodiment, the rotor position sensor 12 is positioned in such a way that it can detect the end face of the rotor shaft W as a reference surface. The cables or other electrical conductors for connecting the rotor position sensor 12 to the engine control unit can be routed through the cover-like carrier T to the outside (sealed bushing) and then laid on the outside of the stator housing, along the direction of the motor control unit. The elements that protect and seal the conductors at the bushing point can also form a form fit with the stator 3 that is effective in the circumferential direction and can thus serve as an anti-rotation device for the rotor position sensor 12. The illustration also shows an alternative bearing variant for the rotor 4. The rotor shaft W is supported on each side by a bearing point 611, 612 designed as a deep groove ball bearing on the respective stator half. One side is designed as a fixed bearing and the other side as a floating bearing.

Figure 7:
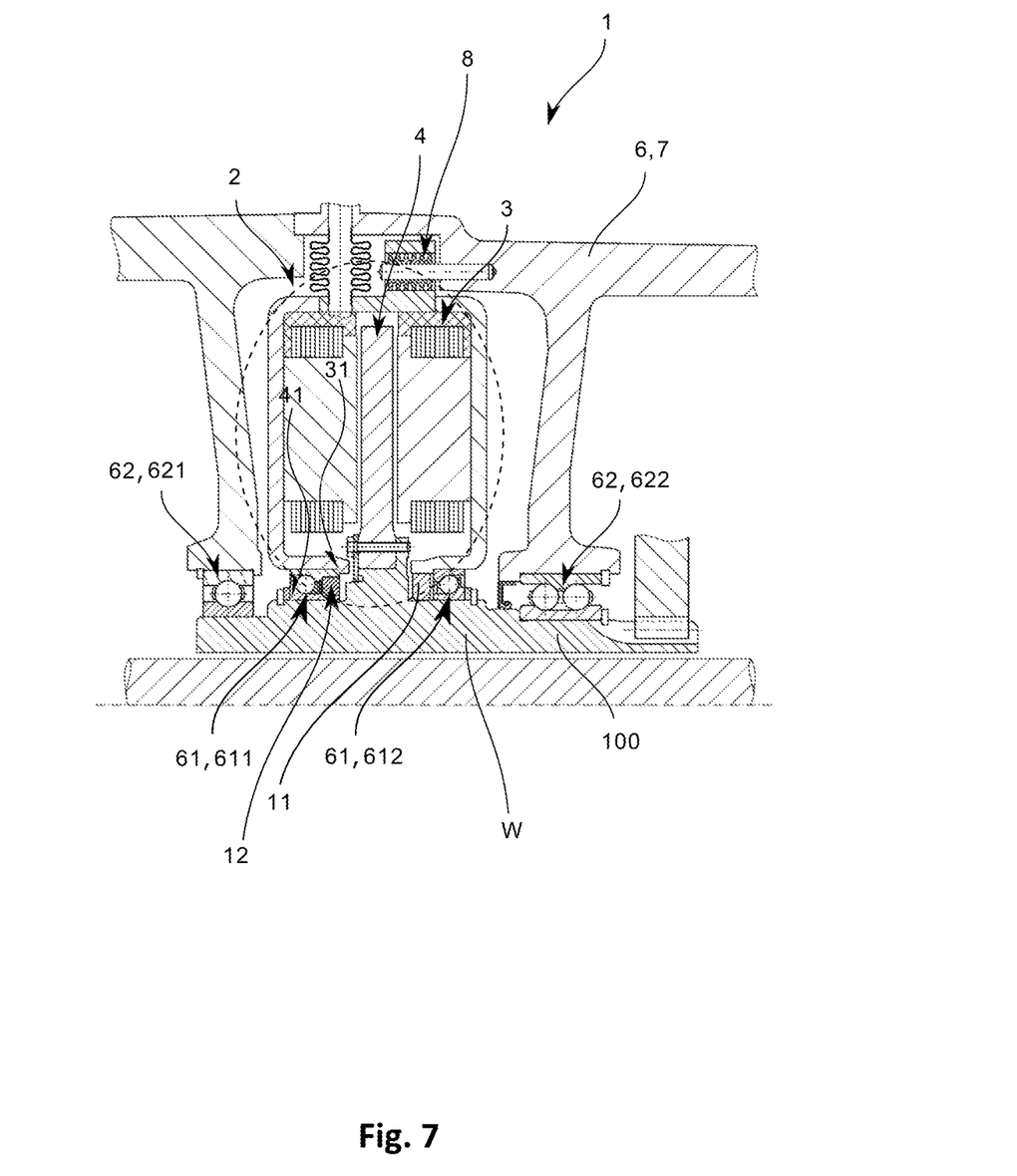
FIG. 7 shows a further possible arrangement of the shaft grounding ring and rotor position sensor, wherein the stator of the axial flux machine is supported in the housing via a flexible torque support.

FIG. 7 shows a further possible arrangement of the shaft grounding element 11 and the rotor position sensor 12, wherein the stator 3 is supported in the housing 7 via a flexible torque support in the form of a so-called length compensation element 8. FIG. 7 is intended to make it clear that the possibilities presented here of arranging the rotor position sensor 12 and/or the shaft grounding elements 11 in a functionally sensible manner in the smallest of spaces can be combined with very different designs for the rotor bearing. In this exemplary embodiment, the rotor shaft W is supported by a bearing 62 by means of two bearing points 621, 622 in opposite side walls of a housing 7 of the axial flux machine 2 and the stator 3 of the axial flux machine 2 is in turn supported by a further bearing 61 by means of two axially spaced bearing points 611, 612 of the rotor shaft W and additionally secured via a torque support 8 against unintentional rotation relative to the housing 7.

Figure 8:
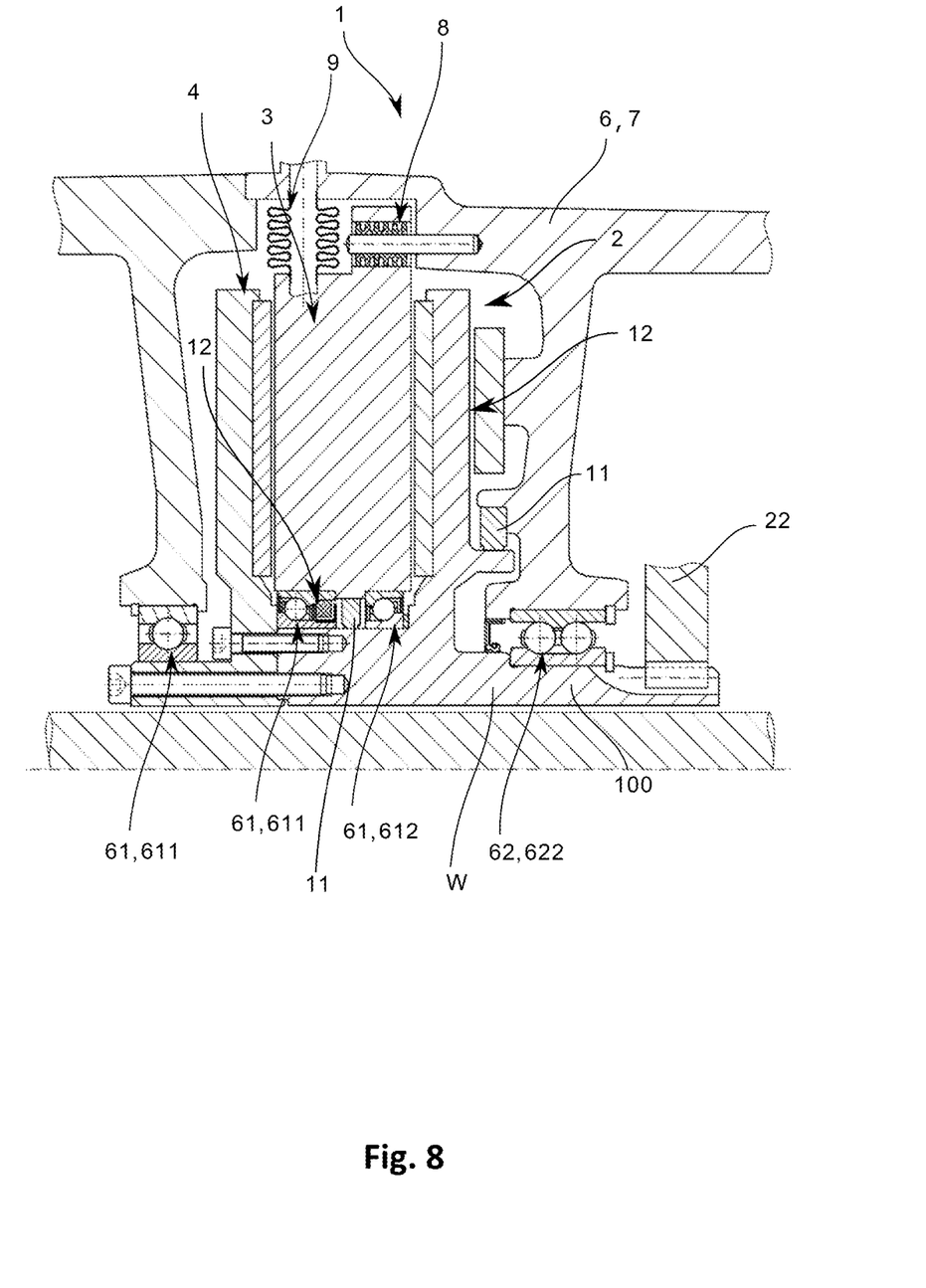
FIG. 8 shows an axial flux machine in an H-arrangement having a shaft grounding ring and a rotor position sensor, arranged between two axially spaced bearing points of a bearing between the rotor and stator, in an axial section in a schematic representation.

FIG. 8 shows an axial flux machine 2 in an H-arrangement, having a shaft grounding element 11 and a rotor position sensor 12, arranged between two bearing points 611, 612, which are spaced apart axially, of a bearing 61 between the rotor 4 and the stator 3. FIG. 8 shows an axial flux motor in an H-arrangement, in which the rotor shaft W is mounted via a bearing 62 by means of two bearing points 621, 622 in opposite side walls of a housing 7 of the axial flux machine 2 and in which the stator 3 is mounted on the rotor 4 or the rotor shaft W. This is achieved via two bearing points 611, 612 that are axially spaced apart from one another and are designed as roller bearings. The rotor position sensor 12 is integrated into one of the roller bearings and the grounding element 11 is arranged between the two bearings. The figure is intended to make it clear that the possibilities presented here of arranging the rotor position sensor 12 and/or the shaft grounding elements 11 in a functionally sensible manner in the smallest of spaces can be combined with axial flux machines 2 of different designs. The designs presented in this disclosure are particularly well suited for axial flux motors in an I-arrangement, H-arrangement and J-arrangement.

Figure 9:
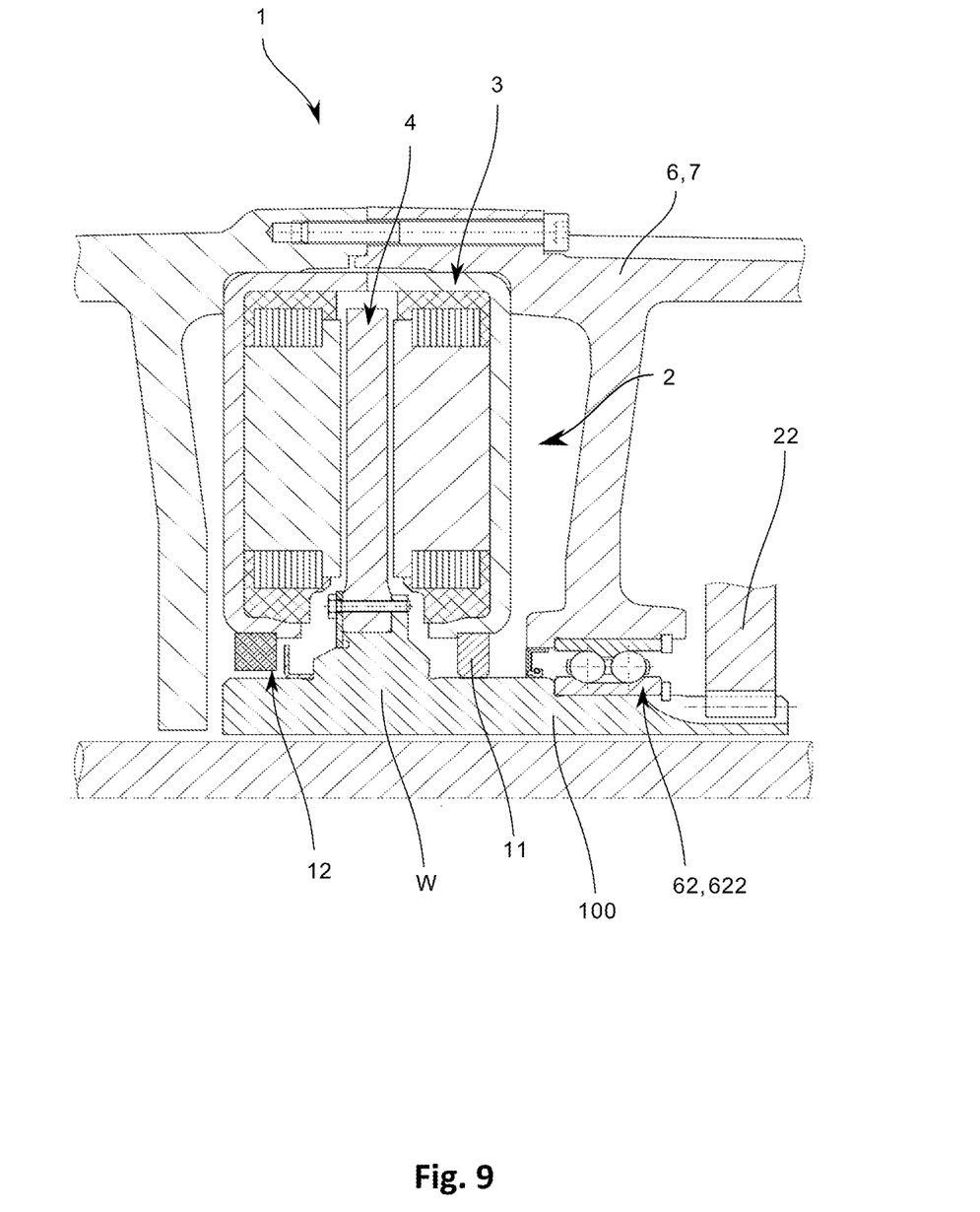
FIG. 9 shows a further example of an axial flux machine in an !-arrangement having a further possibility of arranging the shaft grounding ring and rotor position sensor, in an axial section in a schematic representation, wherein the stator is arranged in the housing for conjoint rotation and displacement therewith and wherein the rotor is supported via a single bearing point in a side wall of the housing.

FIG. 9 shows a further example of an axial flux machine in an I arrangement, having a further possibility of arranging the shaft grounding element 11 and rotor position sensor 12, in an axial section in a schematic representation. The stator 3 is arranged in the housing 7 so that it cannot rotate and move, while the rotor 4 is mounted in a side wall of the housing 7 via a single bearing point 622. The rotor position sensor 12 is arranged axially on one side of the rotor 4 and the shaft grounding element 11 on the other side.

Figure 10:
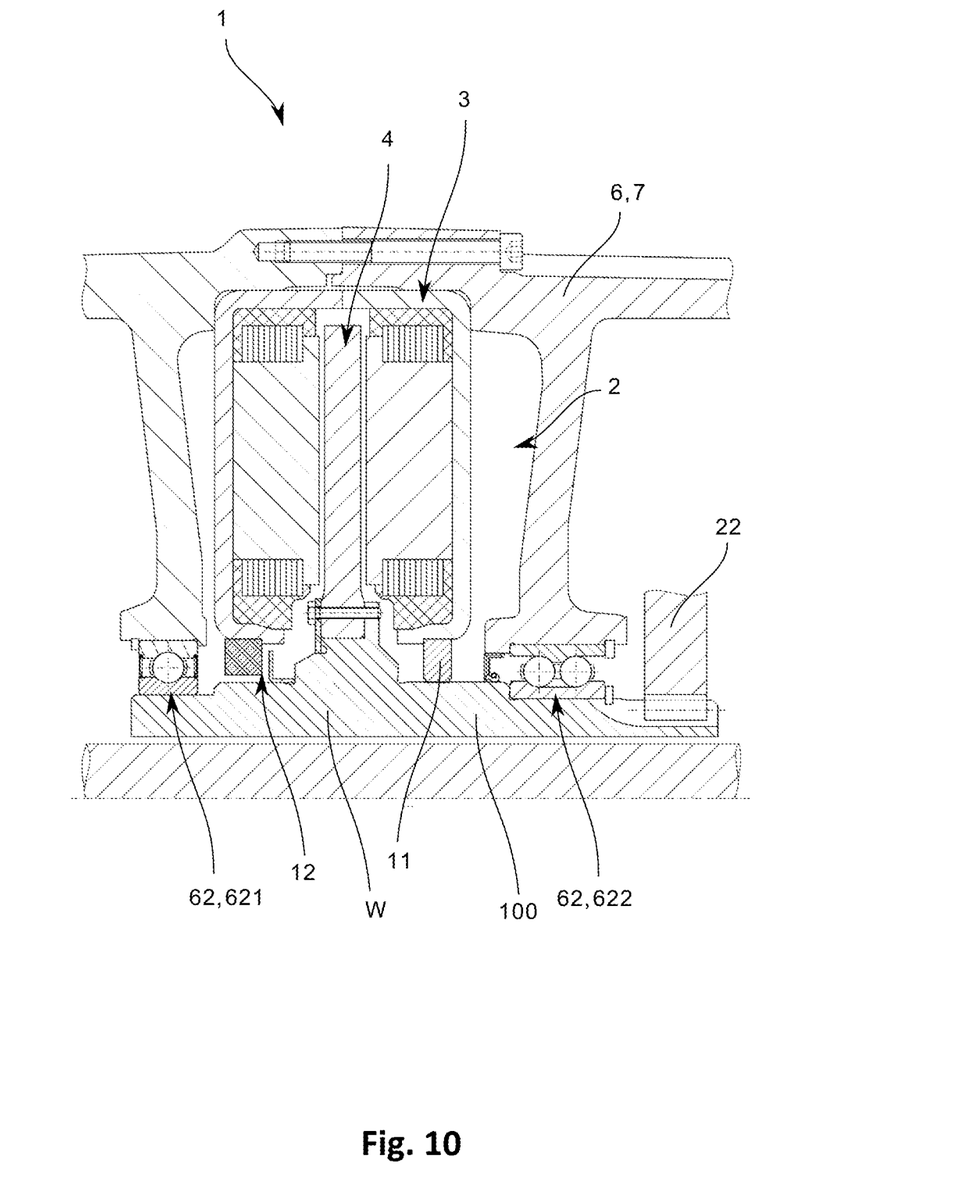
FIG. 10 shows an example of an axial flux machine in an I-arrangement analogous to the embodiment according to FIG. 9, wherein the stator is arranged in the housing for conjoint rotation and displacement therewith, and wherein the rotor is mounted in opposite side walls of the housing via two axially spaced bearing points.

FIG. 10 shows an example of an axial flux machine in an I-arrangement analogous to the embodiment according to FIG. 9, wherein the stator 3 is also arranged in the housing 7 for conjoint rotation and displacement therewith, and wherein the rotor 4 is mounted in opposite side walls of the housing 7 via two axially spaced bearing points 621, 622.

If, within the meaning of the disclosure, the rotor 4 is supported on or opposite the stator 3, this means that embodiments in which the stator 3 is arranged in the housing 7 or on the component 6 supporting the stator 3 for conjoint rotation and displacement therewith and in which the rotor 4 is then mounted on the stator 3 via one or more bearing points. The stator 3 is said to be mounted on the rotor 4 when the stator 3 is arranged within the housing 7 via an axially elastic length compensation element 8—i.e., it can move to a small extent within the housing 7—and is supported on the rotor 4 via one or more bearing points (embodiments of FIGS. 7 and 8).

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Electric machine arrangement
2 Axial flux machine
3 Stator
31 Abutment
4 Rotor
41 Abutment
6 Supporting component (supporting the stator)
7 Housing
8 Length compensating element
9 Supply line
11 Shaft grounding ring
12 Rotor position sensor
13 Dry space
14 Sealing element
22 Gear stage
61 Bearing (between the rotor and stator)
611 First bearing point
612 Second bearing point
62 Bearing point (between the rotor and housing)
621 First bearing point
622 Second bearing point
100 Output element
L Electrical connection line
X Axial extension (of the stator)
W Rotor shaft
H Sleeve (for cable routing)
K Drainage channel (for liquid)
T Carrier
D Cover

The invention claimed is:

1. An electric machine, comprising an electric axial flux machine for driving an electrically drivable motor vehicle, having a stator and having a rotor, further comprising a component supporting the stator, and an output element that is in contact with the rotor for conjoint rotation therewith, the rotor being arranged to be rotatably mounted in the electric machine via at least one bearing point, wherein at least one of a shaft grounding element or a rotor position sensor is arranged in a space located between a rotor shaft and the stator in a radial direction and within an axial extent of the stator in an axial direction;
   wherein the at least one of the shaft grounding element and/or the rotor position sensor are arranged in a dry space formed around them; and
   wherein the dry space is configured to be sealed by at least one sealing element, wherein the at least one sealing element is integrated into a bearing point designed as a roller bearing or fastened thereto or arranged at a distance directly adjacent to the bearing point.

2. The electric machine according to claim 1, wherein a bearing is formed between the stator and the rotor.

3. The electric machine according to claim 2, wherein the bearing has a first bearing point and a second bearing point spaced axially apart from the first bearing point.

4. The electric machine according to claim 3, wherein the at least one of the shaft grounding element or the rotor position sensor are arranged between the first bearing point and the second bearing point.

5. The electric machine according to claim 1, wherein the rotor is mounted via at least one bearing by means of at least one first bearing point relative to the component supporting the stator.

6. The electric machine according to claim 1, wherein the shaft grounding element and the rotor position sensor are arranged on axially opposite sides of the rotor.

7. The electric machine according to claim 1, wherein the shaft grounding element and the rotor position sensor are arranged axially on the same side of the rotor.

8. The electric machine according to claim 3, wherein the at least one of the shaft grounding element or the rotor position sensor are arranged outside an axial region formed between the first bearing point and the second bearing point adjacent to the first bearing point or adjacent to the second bearing point.

9. The electric machine according to claim 1, wherein the at least one of the shaft grounding element or the rotor position sensor are integrated into a bearing point designed as a roller bearing.

* * * * *